(12) United States Patent
Urban et al.

(10) Patent No.: US 6,904,130 B2
(45) Date of Patent: Jun. 7, 2005

(54) TEST UNIT FOR INTERFACE BETWEEN TELEPHONE COMPANY DEMARCATION POINT DEVICE AND CUSTOMER'S TELEPHONE SYSTEM

(75) Inventors: Blake R. Urban, Lenoir, NC (US); Kevin Forsberg, Orlando, FL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 170 days.

(21) Appl. No.: 10/601,794

(22) Filed: Jun. 23, 2003

(65) Prior Publication Data

US 2004/0258214 A1 Dec. 23, 2004

(51) Int. Cl.[7] .......................... H04M 1/24; H04M 3/08; H04M 3/22
(52) U.S. Cl. .................. 379/26.01; 379/1.01; 379/9.06; 379/22.06; 379/27.06
(58) Field of Search .......................... 379/1.01, 9, 9.06, 379/14.01, 12, 18–20, 22.03, 23–24, 26.01, 27.01, 27.06

(56) References Cited

U.S. PATENT DOCUMENTS

| | | | | |
|---|---|---|---|---|
| 5,166,925 A | * | 11/1992 | Ward | 370/250 |
| 5,553,136 A | * | 9/1996 | Meyerhoefer et al. | 379/413.04 |
| 5,802,143 A | * | 9/1998 | Borchering et al. | 379/33 |
| 5,832,071 A | * | 11/1998 | Voelker | 379/165 |
| 5,854,824 A | * | 12/1998 | Bengal et al. | 379/32.04 |
| 6,039,578 A | * | 3/2000 | Suffi et al. | 439/54 |
| 6,201,853 B1 | * | 3/2001 | Butler et al. | 379/21 |
| 6,222,908 B1 | * | 4/2001 | Bartolutti et al. | 379/27.01 |

* cited by examiner

Primary Examiner—Binh Tieu
(74) Attorney, Agent, or Firm—Myers Bigel Sibley & Sajovec

(57) ABSTRACT

A test unit for determining whether a local telephone company demarcation point device is providing telecommunication signals to one of a plurality of telephone lines of a telephone system includes: a demarcation point connector that is configured to interface with a connector of the demarcation point; a telephone system connector that is configured to interface with a connector of the telephone system; a plurality of switches, each of the switches being configured to selectively connect a connection site of the demarcation point device with a corresponding connection site of the telephone system, the selective connection providing a telephone line therebetween; and an indicator that signals whether a designated connection site of the demarcation point device is providing telecommunication signals to its respective telephone line.

42 Claims, 4 Drawing Sheets

TEST UNIT FOR INTERFACE BETWEEN TELEPHONE COMPANY DEMARCATION POINT DEVICE AND CUSTOMER'S TELEPHONE SYSTEM

FIELD OF THE INVENTION

The present invention relates generally to telephone systems, and more particularly to detecting problems in telephone systems.

BACKGROUND OF THE INVENTION

Many commercial telephone users employ a multi-line telephone system. Typically, such telephone systems permit multiple calls to be fielded at once; some systems employ switching devices and the like in order to enable a live or automated operator to handle incoming and outgoing calls smoothly. As an example, the MERIDIAN system, available from Nortel, has twenty-five separate lines for use by the customer.

The multi-line telephone systems described above are interconnected with telephone lines provided by a commercial local telephone company at a "demarcation point", which represents the location to which the local telephone company delivers telephone signals. The multi-line telephone system interfaces with a demarcation point device to provide service to the customer. One typical demarcation point device for interfacing with the customer's telephone system is an RJ21X device, which provides connections for twenty-five telephone lines. The RJ21X device typically includes a connector, known in this field as an "amphenol" connector, that has twenty-five pairs of "tip and ring" pin connection sites aligned in stacked relationship, with one pin pair site corresponding to each telephone line. The mutli-line telephone system has a mating amphenol connector that interconnects with the amphenol connector of the RJ21X device, thereby connecting the telephone system with the local telephone company.

One problem that can develop as a result of this arrangement is identifying the cause of any malfunction to a telephone line. In many instances, the customer recognizes a problem with a line when attempting to use the telephone in the normal manner (for example, there may be no "dial tone" when the telephone is "off-hook"). When this occurs, the customer is often unable to determine whether the malfunction is present in the local telephone company's lines or in the customer's telephone system itself. As such, ordinarily the customer is forced to contact either the phone company or the vendor of the telephone system, who will send a representative to evaluate the problem. Too often, customer contacts the wrong party first, thereby subjecting itself to the cost of an unproductive, non-corrective service call and delay until the proper party is located. Also, in many instances the telephone system must be disconnected from the demarcation point, which can disable the entire telephone system.

In view of the foregoing, it would be desirable to provide a technique by which a customer can determine the source of a telephone line problem for a multi-line telephone system, and to do so without the need to disconnect the multi-line telephone system from the demarcation point device provided by the local telephone company.

SUMMARY OF THE INVENTION

Embodiments of the present invention can assist a telephone customer to identify the correct party (local telephone company or-vendor) to contact in the event of a telephone malfunction. As a first aspect, embodiments of the present invention are directed to a multi-line telephone system interface assembly, comprising: a local telephone company demarcation point; a multi-line telephone system; and a test unit. The demarcation point device includes a first connector that provides a plurality of connection sites, each of which delivers telecommunication signals corresponding to a respective telephone line. The multi-line telephone system is configured to provide a plurality of telephone lines to users. The telephone system includes a second connector with a plurality of connection sites, the second connector being configured to mate with the first connector such that each of the connection sites of the first connector can be connected with a respective connection site of the second connector to provide a corresponding telephone line to a user. The test unit is connected between the first and second connectors. The test unit has a demarcation point connector that interfaces with the first connector and a telephone system connector that interfaces with the second connector. The test unit includes a plurality of switches, each of the switches being configured to selectively connect respective pairs of connection sites of the first and second connectors to provide a telephone line therebetween. The test unit further comprises an indicator that signals whether a designated connection site of the first connector is providing telecommunication signals to its corresponding telephone line. With this configuration, a repairman can determine quickly whether a problem with a telephone line is attributable to the equipment of the local telephone company or the telephone system, and can do so without the need to disconnect the telephone system from the demarcation point device.

As a second aspect, embodiments of the present invention are directed to a multi-line telephone system interface assembly, comprising a local telephone company demarcation point and telephone system as described above. A test unit is connected between the first and second connectors and has a demarcation point connector that interfaces with the first connector and a telephone system connector that interfaces with the second connector. The test unit includes a plurality of switches, each of the switches being configured to selectively connect pairs of connection sites of the first and second connectors to provide a telephone line therebetween. The test unit further comprises means for determining whether a connection site of the first connector is providing a dial tone to its respective telephone line.

As a third aspect, embodiments of the present invention are directed to a test unit for determining whether a local telephone company demarcation point device is providing telecommunication signals to one of a plurality of telephone lines of a telephone system. The test unit comprises: a demarcation point connector that is configured to interface with a connector of the demarcation point; a telephone system connector that is configured to interface with a connector of the telephone system; a plurality of switches, each of the switches being configured to selectively connect a connection site of the demarcation point device with a corresponding connection site of the telephone system, the selective connection providing a telephone line therebetween; and an indicator that signals whether a designated connection site of the demarcation point device is providing telecommunication signals to its respective telephone line. As described above, such a device can be employed to determine whether a problem with a malfunctioning telephone line is attributable to the equipment of the local telephone company or the telephone system.

As a fourth aspect, embodiments of the present invention are directed to a test unit for determining whether a local telephone company demarcation point device is providing telecommunication signals to one of a plurality of telephone lines of a telephone system, the test unit comprising a demarcation point connector, a telephone system connector, and a plurality of switches as described above. The test unit further comprises means for determining whether a specified connection site of the demarcation point device is providing a dial tone to its respective telephone line.

As a fifth aspect, embodiments of the present invention are directed to a method of testing a telephone line for operability. The method comprises the steps of: connecting a local telephone company demarcation point and a multi-line telephone system with a test unit, the demarcation point device including a first connector that provides a plurality of connection sites, each of which delivers telecommunication signals corresponding to a respective telephone line, the multi-line telephone system configured to provide a plurality of telephone lines to users, the telephone system including a second connector with a plurality of connection sites, the second connector being configured to mate with the first connector such that each of the connection sites of the first connector can be connected with a respective connection site of the second connector to provide a corresponding telephone line to a user, the test unit connected between the first and second connectors, the test unit having a demarcation point connector that interfaces with the first connector and a telephone system connector that interfaces with the second connector, the test unit including a plurality of switches, a respective one the switches being configured to selectively connect a respective pair of connection sites of the first and second connectors to provide a telephone line therebetween, the test unit further comprising an indicator that signals whether a designated connection site of the first connector is providing telecommunication signals to its corresponding telephone line; activating one of the switches to divert a telecommunication signal from one of the telephone lines to the indicator; and monitoring the indicator to determine whether the telecommunication signal is reaching the indicator.

DETAILED DESCRIPTION OF EMBODIMENTS OF THE INVENTION

Figure 1:
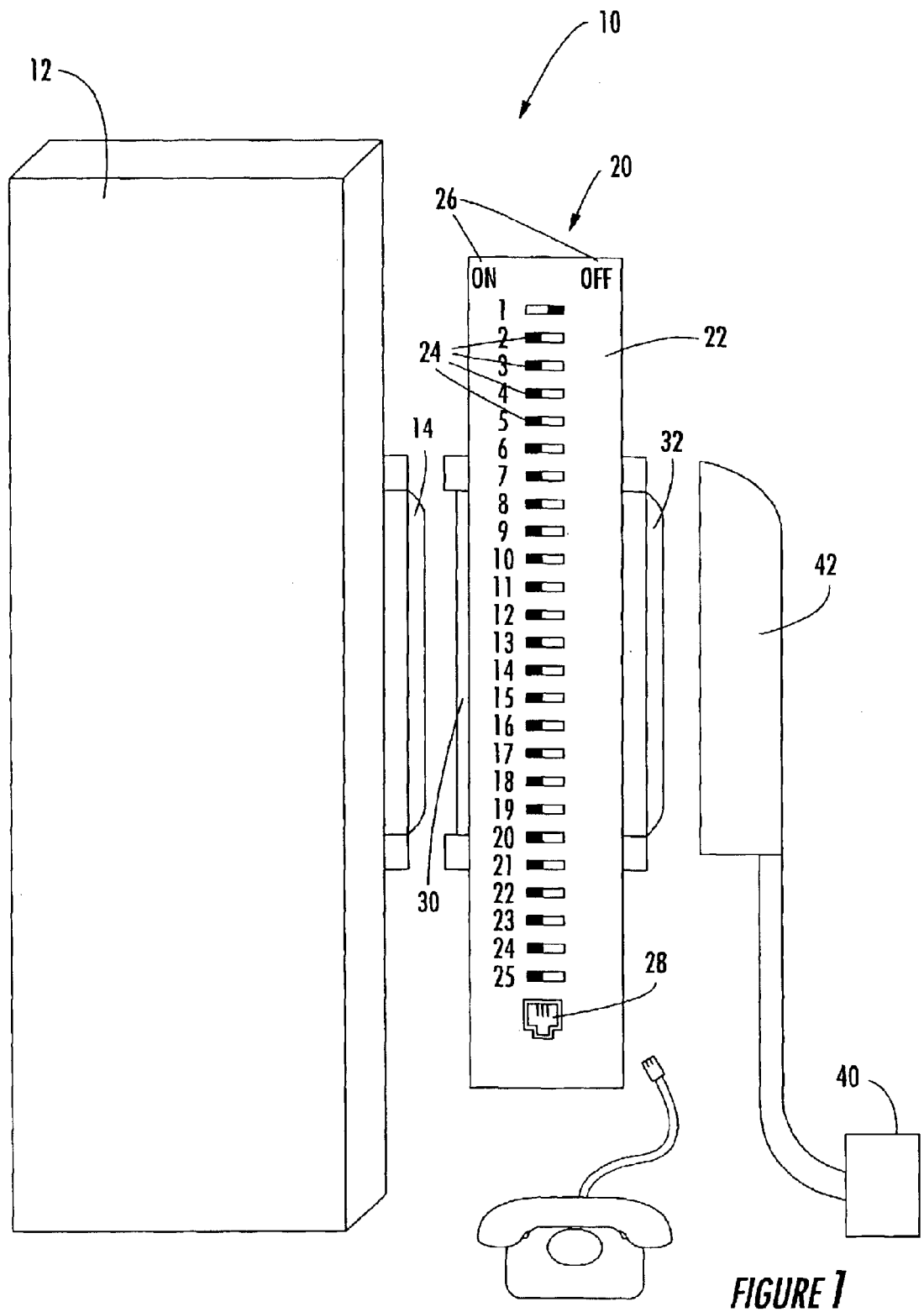
FIG. 1 is an exploded view of an embodiment of the telephone system interface assembly of the present invention.

The present invention will now be described more fully hereinafter, in which embodiments of the invention are shown and described. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, a telephone system interface assembly, designated broadly at 10, is illustrated in FIG. 1. The system interface assembly 10 includes a local telephone company demarcation point device 12, a test unit 20, and a telephone system 40. These components are described in greater detail below.

Figure 2:
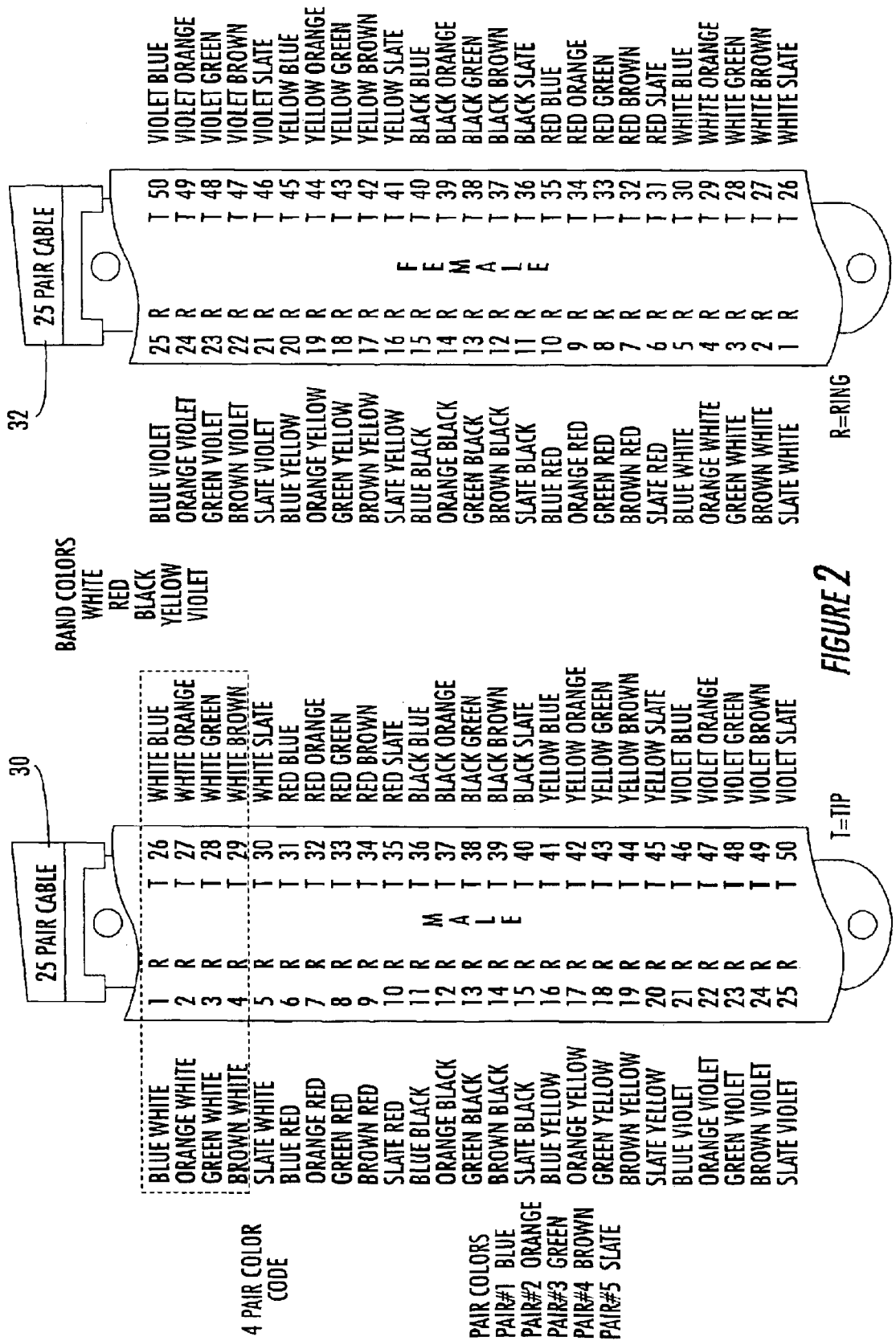
FIG. 2 is a schematic diagram of the connection ports of an "amphenol" connector for use with the telephone system interface assembly of FIG. 1.

Referring again to FIG. 1, the local telephone demarcation point device 12 can be any of a number of demarcation points known to those skilled in this art. The demarcation point device 12 is configured to provide connection sites for a plurality of separate telephone lines. In some embodiments, the demarcation point device 12 is an RJ21X interface, available from Marconi Communications, which provides twenty-five separate telephone lines. Alternative demarcation point devices include an inside network interface (INI), a network interface device (NID), or an RJ48C data jack. The demarcation point device 12 includes a connector 14 that presents the connection sites for interconnection with a mating connector (such as the demarcation connector 30 or the connector 42 discussed below). In some embodiments, the connector is a so-called "amphenol" connector, which provides ports for twenty-five pairs of "ring and tip" connections (see FIG. 2 for a typical amphenol connector arrangement). Each of the connection sites corresponds to one of the telephone lines provided by the demarcation point device, 12.

Still referring to FIG. 1, the telephone system 40 can be any multi-line telephone system recognized by those skilled in this art to be capable of receiving communication signals from the telephone lines provided by the demarcation point device 12 and processing them to produce multiple telephone lines for use. Exemplary telephone systems include the MERIDIAN system, available from Nortel, the ELECTRA system, available from NEC, the STRATA system, available from Toshiba, and the KX systems, available from Panasonic. The telephone system 40 includes a connector 42 having a plurality of connection sites that is configured to mate with the connector 14 of the demarcation point device 12 and receive therefrom communication signals for each of the telephone lines provided by the demarcation point device 12; the telephone system 40 processes those signals to provide usable telephone lines to multiple users. As an example, if the connector 14 is of the amphenol type discussed above, the connector 42 should be a complementary amphenol connector. The configurations of the connector 14 and the connector 42 should be such that, if the connector 14 and the connector 42 were connected, the telephone system 40 would provide an operable telephone line for each telephone line provided by the demarcation point device 12.

Referring once again to FIG. 1, the test unit 20 connects with and bridges the demarcation point device 12 and the telephone system 40. The test unit 20 includes a housing 22 (typically formed of a polymeric material) within and on which electronic components are mounted. The test unit 20 also includes a demarcation point connector 30 that is configured to mate with the connector 14 of the demarcation point device 12 (for example, if the connector 14 is an amphenol connector as described above, the demarcation point connector 30 should also have an amphenol configuration). In doing so, the connector 30 establishes connections for communication signals with each of the plurality of telephone lines provided by the demarcation point device 12. On its opposite side, the test unit 20 includes a telephone system connector 32 that is configured to mate with the connector 42 of the telephone system 40. The telephone system connector 32 establishes connections for communication signals with the telephone lines provided by the telephone system 40. Under typical circumstances, the demarcation connector 30 and the telephone system connector 32 are complementary, as they connect the connector 14 of the demarcation point device 12 and the connector 42 of the telephone system 40 that ordinarily connect with one another.

Referring again to FIG. 1, a plurality of "on-off" switches. 24 are mounted to the housing 22 so as to be externally accessible. Each switch 24 corresponds to one of the plurality of telephone lines provided by the demarcation point device 12. In the illustrated embodiment, each switch 24 is flanked by indicia 26 that denote the "on" or "off" position of the switch 24. Other indicia, such as "open" and "closed", may be used.

Figure 3:
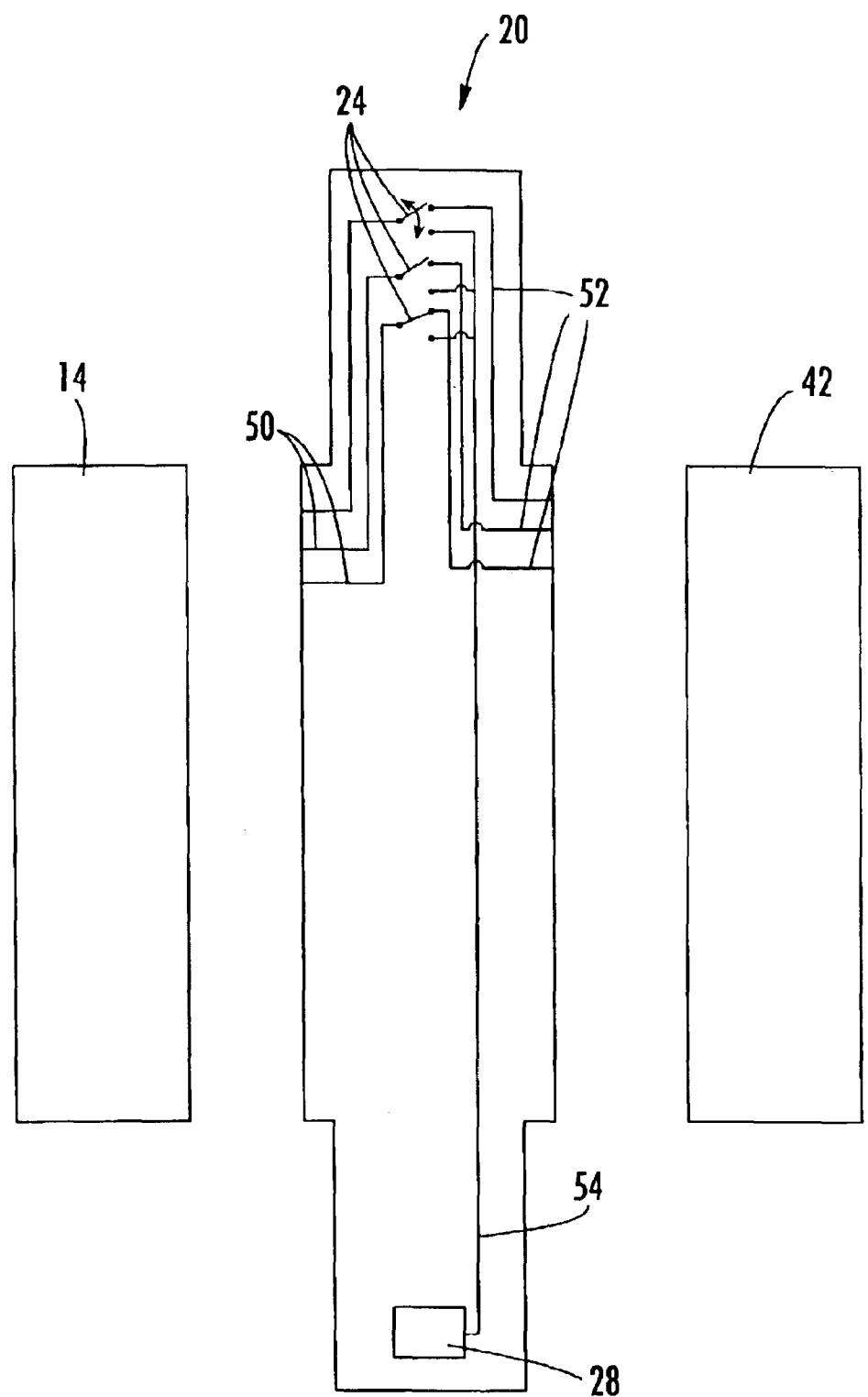
FIG. 3 is a schematic diagram of the telephone system interface assembly of FIG. 1 with the wiring of the test unit exposed.

Referring now to FIG. 3, an exemplary embodiment of the switches 24 and accompanying wiring is illustrated. Each of a plurality of demarcation point lines 50 extends between the connector 30 and a switch 24, thereby establishing a connection between the demarcation point device 12 and the switch 24. Each of a plurality of telephone system lines 52 extends between a switch 24 and the connector 32 to establish a connection between the switch 24 and the telephone system 40. Thus, when a switch 24 is closed (as in the upper portion of FIG. 3), a telephone line connection is created between the demarcation point device 12 and the telephone system 40. Each switch 24 is also connected with a test port line 54 that extends to a test port 28 and/or other indicator, as described below. When a switch 24 is closed (as in the lower portion of FIG. 3), the telephone line signal from the demarcation point device 12 to that switch 24 is diverted to the test port 28.

Referring again to FIG. 1, the externally-accessible test port 28 can, as illustrated, be a RJ-type port (such as an RJ-11 or RJ-45 port) that can accept a standard RJ-type plug (which would, in turn, be connected with a typical telephone handset). Alternatively, or in addition, the test port 28 can be any type of port or other indicator that can indicate whether communication signals (typically in the form of dial tone) are being provided by the demarcation point device 12; examples include an LED responsive to the communication signals from the demarcation point device 12 or an audio speaker that projects the sounds provided by the demarcation point device 12.

Usage of the test unit 20 can be as follows. The test unit 20 can be installed in the manner described, with the connector 14 of the demarcation point device 12 connected with the connector 30 of the test unit 20 and the connector 42 of the telephone system connected with the connector 32 of the test unit 20. All of the switches 24 of the test unit 20 are moved to the "on" position, which establishes telephone line connections between the demarcation point device 12 and the telephone system 40. The test unit 20 can be installed at initial installation of the telephone system 40 or can be retrofitted into an existing connection between the demarcation point device 12 and the telephone system 40. The test unit 20 can remain in this condition for ordinary use.

When a telephone system user discovers a problem with a specific telephone line, a repairman (or even the user) can employ the test unit 20 to determine whether the problem is associated with the telephone system or with the local telephone company. The repairman can move the switch 24 that corresponds to the problematic telephone line to the "off" position. This action switches the telephone line of interest away from the telephone system 40 to the test port 28. The repairman can then connect a telephone handset to the test port 28 to determine whether signals are being received (e.g., whether a dial tone is heard). If a dial tone is present, the problem likely lies with the telephone system 40, at which point the telephone system service provider can be contacted for service. If there is no dial tone, the problem likely lies with the equipment provided by the local telephone company (i.e., the problem is located at the demarcation point device 12 or upstream therefrom), and the local telephone company can be contacted for service. In this manner, the proper repair service can be identified immediately. Also, this assessment can be made without disconnecting the telephone system 40 from the demarcation point device 12, which would cause the other telephone lines to become temporarily inoperable.

As noted above, the test unit 20 may also take alternative configurations, which operate on the same principles, but with somewhat different operation. For example, if an LED is employed as the indicator, when a switch 24 for a particular telephone line is moved to the "off" position, the LED may light if communication signals are received at the indicator and fail to light if they are not. Similarly, employment of an audio speaker as an indicator would cause the dial tone to be heard through the speaker once a switch was moved to the "off" position if communications signals were being received. Those skilled in this art will recognize other means for determining whether a connection site of the demarcation point device is providing a dial tone to its respective telephone line.

Figure 4:
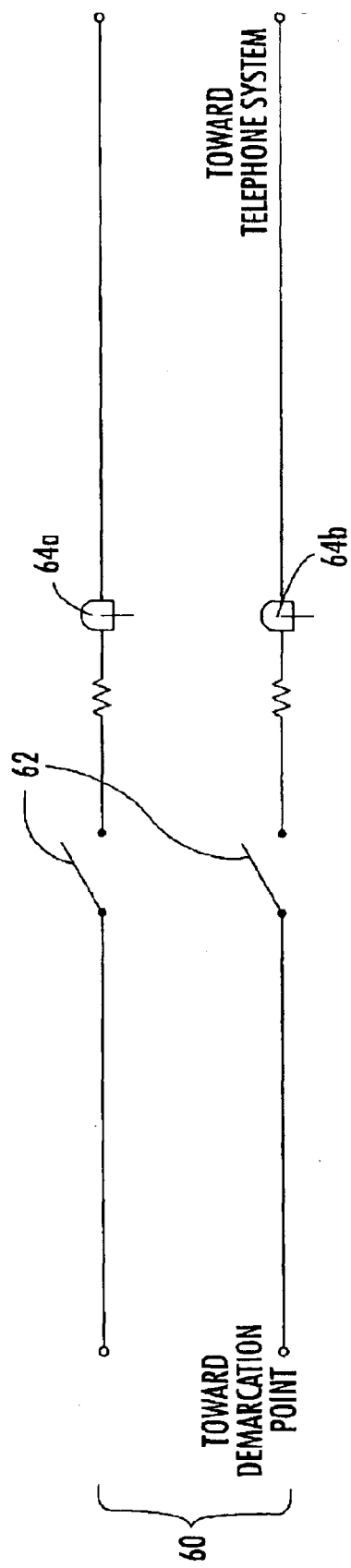
FIG. 4 is a schematic diagram of another embodiment of a test unit of the present invention in which light-emitting diodes (LEDs) are employed to determine whether a telephone line is in operation.

An additional embodiment for switches of a test unit is illustrated in FIG. 4, which shows a telephone line 60, a test switch 62, and a pair of LED-resistor pairs 64a, 64b. In this embodiment, when the telephone line 60 is not in use (i.e., it is "on-hook"), the LEDs 64a, 64b are not illuminated. Use of the telephone line 60 completes the circuit defined by the telephone line 60, thereby causing the LEDs 64a, 64b to illuminate (such illumination can alert a repairman that the line 60 is in use). In the event that a portion of the telephone line 60 downstream of the switch 62 becomes grounded, the LED 64a, 64b connected with that portion of the telephone line 60 will illuminate, thereby indicating the presence of the grounding of the telephone line 60 and on which portion of the telephone line 60 the grounded state is located. Use of the switch 62 to indicate other telephone line problems is as discussed above in connection with the switch 24 shown in FIGS. 1–3.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. As such, all such modifications are intended to be included within the scope of this invention. The scope of the invention is to be defined by the following claims.

That which is claimed is:

1. A multi-line telephone system interface assembly, comprising:

a local telephone company demarcation point, the demarcation point device including a first connector that provides a plurality of connection sites, each of which delivers telecommunication signals corresponding to a respective telephone line;

a multi-line telephone system configured to provide a plurality of telephone lines to users, the telephone system including a second connector with a plurality of connection sites, the second connector being configured to mate with the first connector such that each of the connection sites of the first connector can be connected with a respective connection site of the second connector to provide a corresponding telephone line to a user; and a test unit connected between the first and second connectors, the test unit having a demarcation point connector that interfaces with the first connector and a telephone system connector that interfaces with the second connector, the test unit including a plurality of switches, a respective one the switches being configured to selectively connect a respective pair of connection sites of the first and second connectors to provide a telephone line therebetween, the test unit further comprising an indicator that signals whether a designated connection site of the first connector is providing telecommunication signals to its corresponding telephone line.

2. The system interface assembly defined in claim 1, wherein the first and second connectors are amphenol connectors.

3. The system interface assembly defined in claim 1, wherein the indicator comprises an RJ-type port.

4. The system interface assembly defined in claim 3, further comprising a telephone handset connected with the RJ-type port.

5. The system interface assembly defined in claim 1, wherein the indicator comprises an audio speaker.

6. The system interface assembly defined in claim 1, wherein the demarcation point device comprises an RJ21X demarcation point device.

7. The system interface assembly defined in claim 1, wherein the test unit includes an LED corresponding to each switch to indicate whether the telephone line corresponding to that switch is in operation.

8. The system interface assembly defined in claim 1, wherein the demarcation point connector and the telephone system connector are complementary.

9. The system interface assembly defined in claim 1, wherein the plurality of connection sites of the first connector is twenty-five connection sites.

10. A multi-line telephone system interface assembly, comprising:

a local telephone company demarcation point, the demarcation point device including a first connector that provides a plurality of connection sites, each of which delivers telecommunication signals corresponding to a respective telephone line;

a telephone system configured to provide a plurality of telephone lines to users, the telephone system including a second connector with a plurality of connection sites, the second connector being configured to mate with the first connector such that each of the connection sites of the first connector can be connected with a respective connection site of the second connector to provide a corresponding telephone line to a user; and a test unit connected between the first and second connectors, the test unit having a demarcation point connector that interfaces with the first connector and a telephone system connector that interfaces with the second connector, the test unit including a plurality of switches, a respective one of the switches being configured to selectively connect a respective pair of connection sites of the first and second connectors to provide a telephone line therebetween, the test unit further comprising means for determining whether a connection site of the first connector is providing a dial tone to its respective telephone line.

11. The system interface assembly defined in claim 10, wherein the first and second connectors are amphenol connectors.

12. The system interface assembly defined in claim 10, wherein the means for determining comprises an RJ-type port.

13. The system interface assembly defined in claim 12, further comprising a telephone connected with the RJ-type port.

14. The system interface assembly defined in claim 10, wherein the means for determining comprises an audio speaker.

15. The system interface assembly defined in claim 10, wherein the demarcation point device comprises an RJ21X demarcation device.

16. The system interface assembly defined in claim 10 wherein the test unit further comprises an LED corresponding to each switch to indicate whether the corresponding telephone line is in operation.

17. The system interface assembly defined in claim 10, wherein the demarcation point connector and the telephone system connector are complementary.

18. The system interface assembly defined in claim 10, therein the plurality of connection sites of the first connector is twenty-five connection sites.

19. A test unit for determining whether a local telephone company demarcation point device is providing telecommunication signals to one of a plurality of telephone lines of a telephone system, the test unit comprising:

a demarcation point connector that is configured to interface with a connector of the demarcation point;

a telephone system connector that is configured to interface with a connector of the telephone system;

a plurality of switches, a respective one of the switches being configured to selectively connect a connection site of the demarcation point device with a corresponding connection site of the telephone system, the selective connection providing a telephone line therebetween; and an indicator that is configured to signal whether a designated connection site of the demarcation point device is providing telecommunication signals to its respective telephone line.

20. The test unit defined in claim 19, wherein the demarcation and telephone system connectors are amphenol connectors.

21. The test unit defined in claim 19, wherein the indicator comprises an RJ-type port.

22. The test unit defined in claim 21, further comprising a telephone connected with the RJ-type port.

23. The test unit defined in claim 19, wherein the indicator comprises an audio speaker.

24. The test unit defined in claim 19, wherein the test unit further comprises an LED corresponding to each switch to indicate whether the corresponding telephone line is in operation.

25. The test unit defined in claim 19, wherein the demarcation point connector and the telephone system connector are complementary.

26. The test unit defined in claim 19, wherein the plurality of switches is twenty-five switches.

27. A test unit for determining whether a local telephone company demarcation point device is providing telecommunication signals to one of a plurality of telephone lines of a telephone system, the test unit comprising:
- a demarcation point connector that is configured to interface with a connector of the demarcation point;
- a telephone system connector that is configured to interface with a connector of the telephone system;
- a plurality of switches, each of the switches being configured to selectively connect a connection site of the demarcation point device with a corresponding connection site of the telephone system, the selective connection providing a telephone line therebetween; and
- means for determining whether a specified connection site of the demarcation point device is providing a dial tone to its respective telephone line.

28. The test unit defined in claim 27, wherein the demarcation point and telephone system connectors are amphenol connectors.

29. The test unit defined in claim 27, wherein the means for determining comprises an RJ-type port.

30. The test unit defined in claim 29, further comprising a telephone handset connected with the RJ-type port.

31. The test unit defined in claim 27, wherein the means for determining comprises an audio speaker.

32. The test unit defined in claim 27, wherein the test unit further comprises an LED corresponding to each switch to determine whether the corresponding telephone line is in operation.

33. The test unit defined in claim 27, wherein the demarcation point connector and the telephone system connector are complementary.

34. The test unit defined in claim 27, wherein the plurality of switches is twenty-five switches.

35. A method of testing a telephone line for operability, comprising the steps of:
- connecting a local telephone company demarcation point and a multi-line telephone system with a test unit, the demarcation point device including a first connector that provides a plurality of connection sites, each of which delivers telecommunication signals corresponding to a respective telephone line, the multi-line telephone system configured to provide a plurality of telephone lines to users, the telephone system including a second connector with a plurality of connection sites, the second connector being configured to mate with the first connector such that each of the connection sites of the first connector can be connected with a respective connection site of the second connector to provide a corresponding telephone line to a user, the test unit connected between the first and second connectors, the test unit having a demarcation point connector that interfaces with the first connector and a telephone system connector that interfaces with the second connector, the test unit including a plurality of switches, a respective one the switches being configured to selectively connect a respective pair of connection sites of the first and second connectors to provide a telephone line therebetween, the test unit further comprising an indicator that signals whether a designated connection site of the first connector is providing telecommunication signals to its corresponding telephone line;
- activating one of the switches to divert a telecommunication signal from one of the telephone lines to the indicator; and
- monitoring the indicator to determine whether the telecommunication signal is reaching the indicator.

36. The method defined in claim 35, wherein the demarcation and telephone system connectors are amphenol connectors.

37. The method defined in claim 35, wherein the indicator comprises an RJ-type port.

38. The method defined in claim 37, further comprising a telephone connected with the RJ-type port.

39. The method defined in claim 35, wherein the indicator comprises an audio speaker.

40. The method defined in claim 35, wherein the test unit further comprises an LED corresponding to each switch to indicate whether the corresponding telephone line is in operation.

41. The method defined in claim 35, wherein the demarcation point connector and the telephone system connector are complementary.

42. The method defined in claim 35, wherein the plurality of switches is twenty-five switches.

* * * * *